United States Patent Office 3,536,521
Patented Oct. 27, 1970

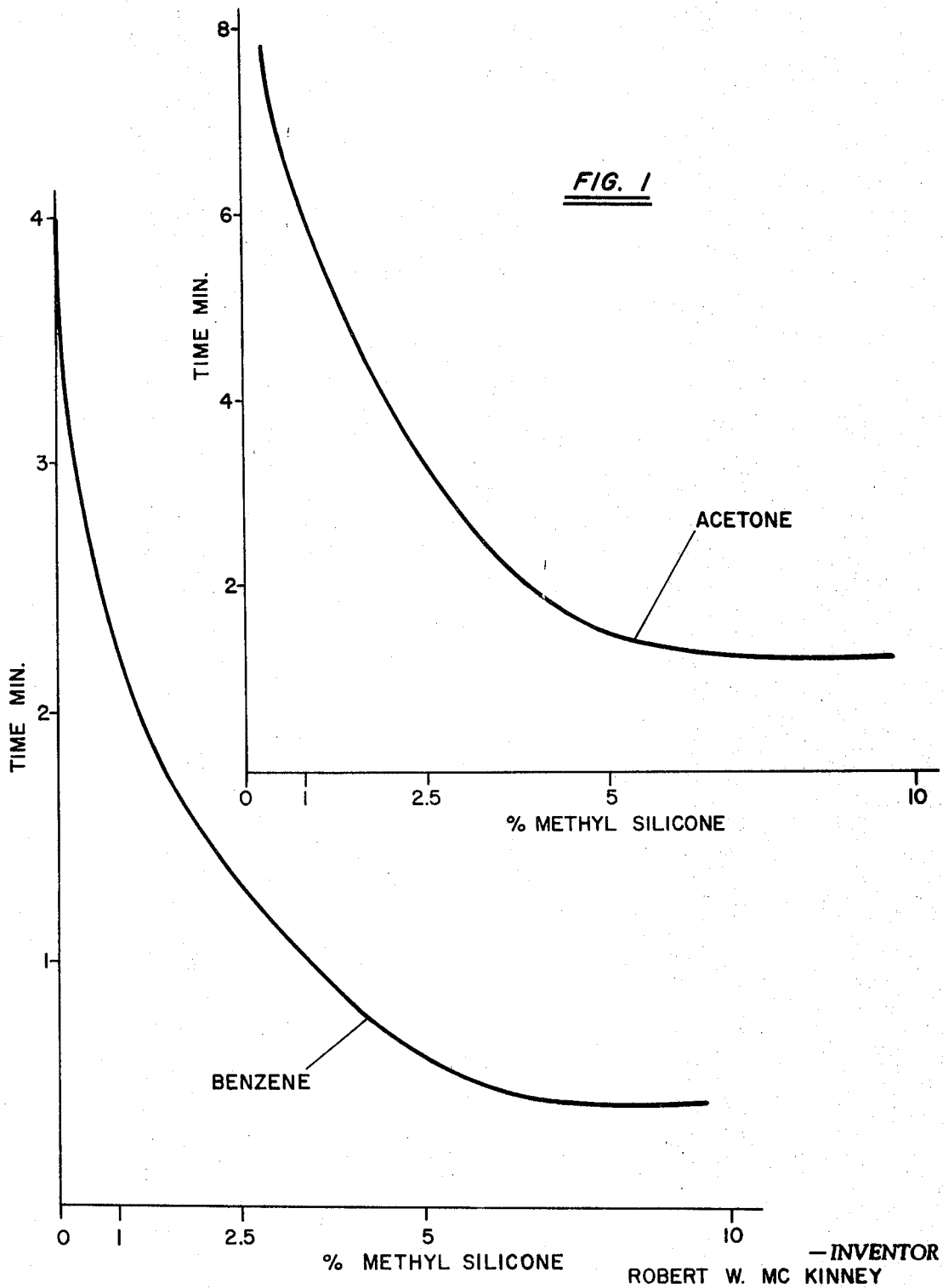

3,536,521
COATING OF MOLECULAR SIEVES
Robert W. McKinney, Adelphi, and Richard A. Hamilton, Beltsville, Md., assignors to W. R. Grace & Co., New York, N.Y., a corporation of Connecticut
Filed Dec. 1, 1967, Ser. No. 687,176
Int. Cl. B44d 1/00
U.S. Cl. 117—98                    4 Claims

ABSTRACT OF THE DISCLOSURE

When using molecular sieves as a drying or dehydrating agent for gases the gases are often adsorbed on the surface of the molecular sieve. By coating the molecular sieve with a silicone the adsorption of gas on the surface is prevented.

---

Figures 3, 4:
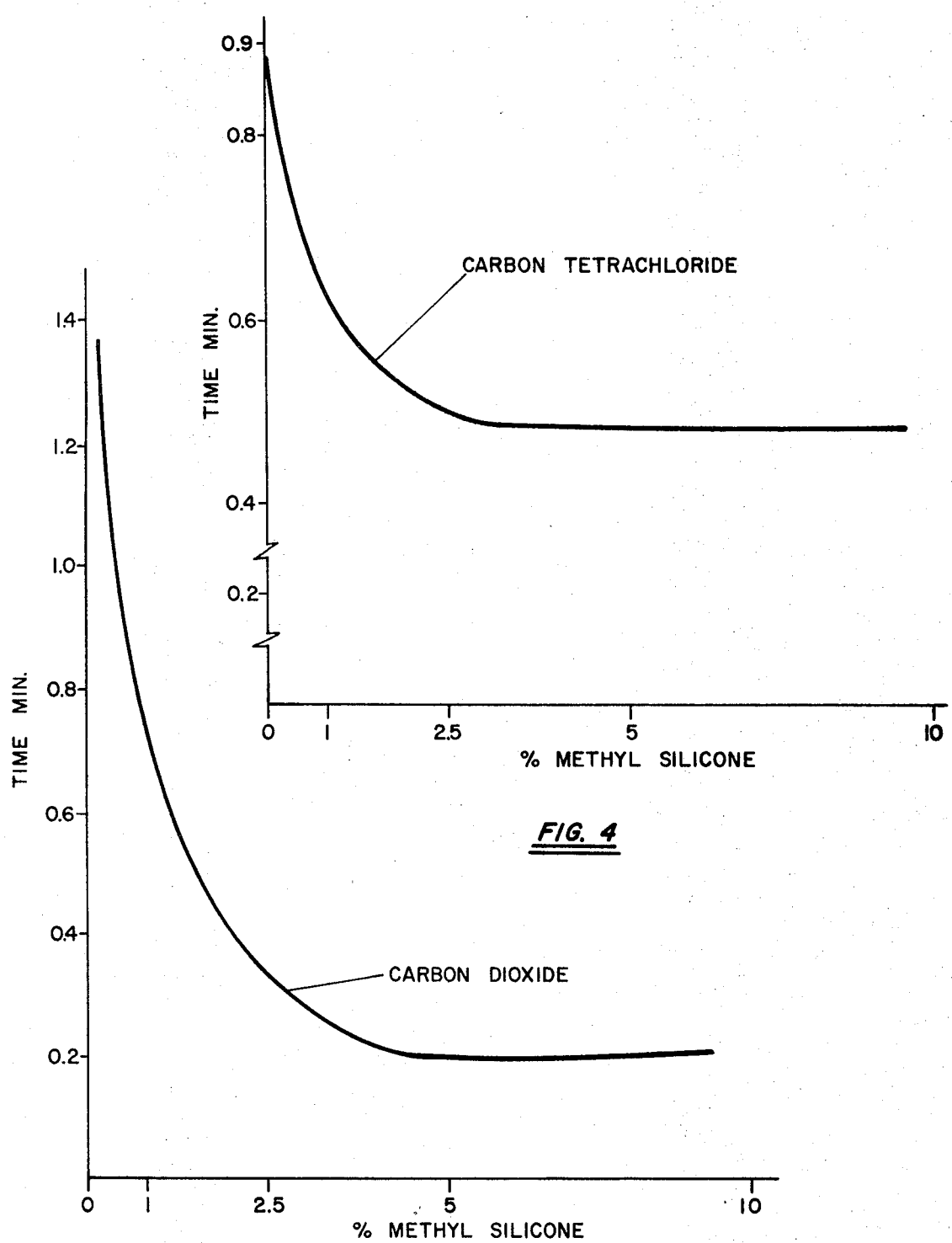

This invention relates to molecular sieves. In one particular aspect it relates to a coating composition for molecular sieves to prevent the adsorption of gases thereon.

It is known that certain synthetic crystalline zeolites of suitable pore size have remarkably high affinity for water. Molecular sieves are crystalline zeolites that may be described as an open three-dimensional framework of $SiO_4$ and $AlO_4$ tetrahedra. Molecular sieves having pores with a minimum dimension of less than about 4.7 A. units are most commonly used in the drying and dehydrating of gases.

One of the problems associated with the use of molecular sieves is the adsorption on the sieve surface of the gases to be dried. This problem is further aggravated when the adsorbed gases react at active sites on the sieve surface. For example, the Freons (fluorinated hydrocarbons) used in refrigerant systems react at active sites on a molecular sieve surface with subsequent decomposition into halogen acids which reacts with the basic structure of the molecular sieve.

It is therefore an object of this invention to provide a molecular sieve which does not adsorb or react with material to be dried.

Broadly, this is accomplished by coating molecular sieves with silicones. Among the silicones which have been found to be satisfactory are Dow-Corning 710-phenylmethyl silicone, General Electric SF–96, methyl silicone, General Electric F–50-chlorophenylmethyl silicone, General Electric SE–52-phenyl silicone, General Electric SE-54-methylphenylvinyl silicone and the like.

These silicone coatings have proved to be most satisfactory on Type A silica alumina sieve having a 3 A. unit pore and a silica-alumina ratio of about 2.

The silicone coating can be conveniently applied to the sieve surface by dissolving the silicone oil in an appropriate solvent, adding the sieves to the resulting solution, evaporating the solvent, leaving a uniform silicone deposit on the sieve surface. The sieve is then thermally activated for use as a drying agent.

Coatings on the order of one to 10 percent by weight of silicone oil on sieve surface have proved to be satisfactory, with a preferred coating percentage being 5 to 10 percent. These percentages are based on the weight of the sieve.

Among the gases which have been found to be non-adsorptive on the coated sieve surface are carbon dioxide, sulfur dioxide, carbon tetrachloride, benzene, acetone, ethyl acetate, refrigerants (i.e. 11, trichlorofluoromethane; 12, dichlorodifluoromethane; 22, monochlorodifluoromethane), and the like.

It is understood that the silicone coated molecular sieves of this invention are applicable to many different drying systems, i.e. drying of natural gas, refrigerant drying in refrigeration units, etc. Other drying systems will become apparent to those skilled in the art.

The invention is illustrated by, not limited to the following specific examples.

EXAMPLE I

To illustrate the effectiveness of coating molecular sieves with a silicone oil, Type A molecular sieves having a 3 A. unit pore were coated with methyl silicone by adding the sieve to a methylene chloride solution of the silicone and evaporating the solvent. The coated sieves were activated by heating to 300° C. for 1½ hours.

Gas chromatographic columns were prepared from the activated coated sieves by packing them into a 3 ft. by ½ inch stainless steel tube. The tubes were used in a Perkin Elmer 154 gas chromatograph operated at 25° C. using helium at a flow of 170 cc. per minute as the carrier gas.

Various gases were run through the chromatographic columns at various percent concentrations of the silicone (based on the weight of the sieve) upon the molecular sieves. The results are shown in the drawings which graphically depict the retention time of the individual gases vs. the concentration of methyl silicone on the molecular sieve.

Figures 5, 6:
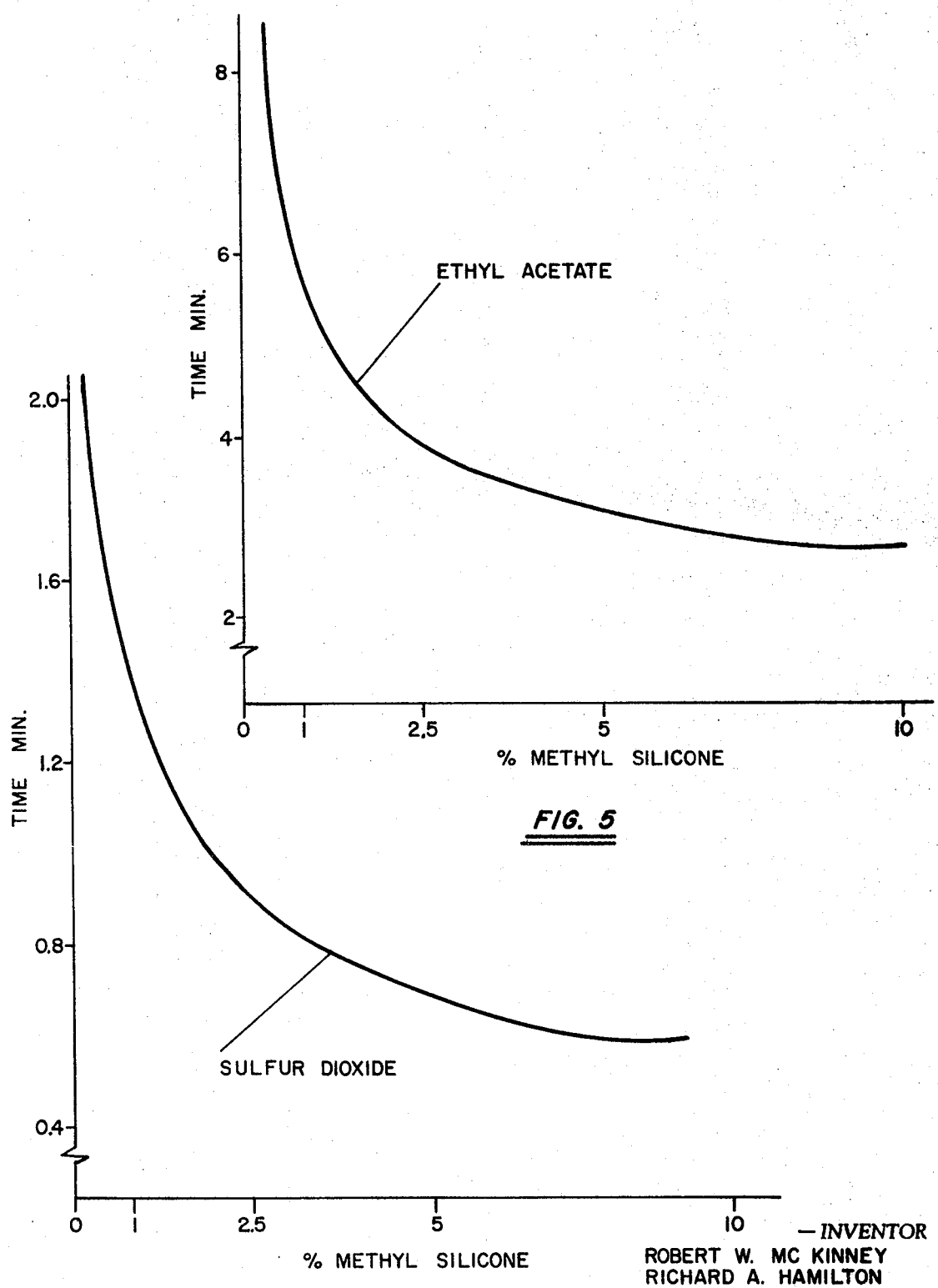

The graphs are identified as follows: FIG. 1 acetone, FIG. 2 benzene, FIG. 3 carbon dioxide, FIG. 4 carbon tetrachloride, FIG. 5 ethylacetate, and FIG. 6 sulfur dioxide.

An inspection of the graph shows the adsorption of individual gases on the molecular sieve surfaces decreases with increasing concentration of the methyl silicone. The most effective concentration of the silicone is from 5 to 10% at which concentration substantially no adsorption of the gas takes place on the surface of the sieve. The retention time in each case at 5 to 10% is essentially the residence time of the particular gas within the gas chromatography column.

EXAMPLE II

Type A silica alumina molecular sieves having a 3 A. unit pore were coated with various concentrations of methyl silicone as described in Example I. The sieves were activated as described above, and tested for water absorption at various relative humidities. The results show that no substantial change in water absorption of the molecular sieves takes place with increasing concentration of methyl silicone on the surface of the sieve. There is essentially no difference in water absorption between the uncoated and the coated molecular sieves.

What is claimed is:
1. A method for preventing the adsorption of gases other than water vapor on the surface of a molecular sieve, said molecular sieve having a silica-alumina ratio of about 2 and having a 3 A. unit pore, which comprises coating said sieve with from about 1 to 10 percent by weight based on the weight of the sieve of a silicone compound selected from the group consisting of methyl silicone, methyl phenyl silicone, phenyl methyl silicone, methyl phenyl vinyl silicone, and chlorophenyl methyl silicone.

2. A method according to claim 1 wherein said silicone is methyl silicone.

3. A molecular sieve having a silica-alumina ratio of about 2, having a 3 A. unit pore, and having a coating on the external surface thereof, said coating consisting of a silicone compound selected from the group consisting of methyl silicone, methyl phenyl silicone, phenyl methyl silicone, methyl phenyl vinyl silicone and chlorophenyl methyl silicone.

4. A molecular sieve according to claim 3 wherein said silicone compound is methyl silicone.

References Cited

UNITED STATES PATENTS

| | | | |
|---|---|---|---|
| 3,164,453 | 1/1965 | Milton | 55—75 X |
| 2,839,158 | 6/1958 | Reinauer | 117—98 X |
| 2,774,585 | 12/1956 | Wirts | 117—98 X |
| 2,673,823 | 3/1954 | Biefeld | 117—98 X |
| 2,541,838 | 2/1951 | Shardlow | 117—123 X |

ALFRED L. LEAVITT, Primary Examiner

W. E. BALL, Assistant Examiner

U.S. Cl. X.R.

55—75; 117—100, 123, 161